Figure 1:
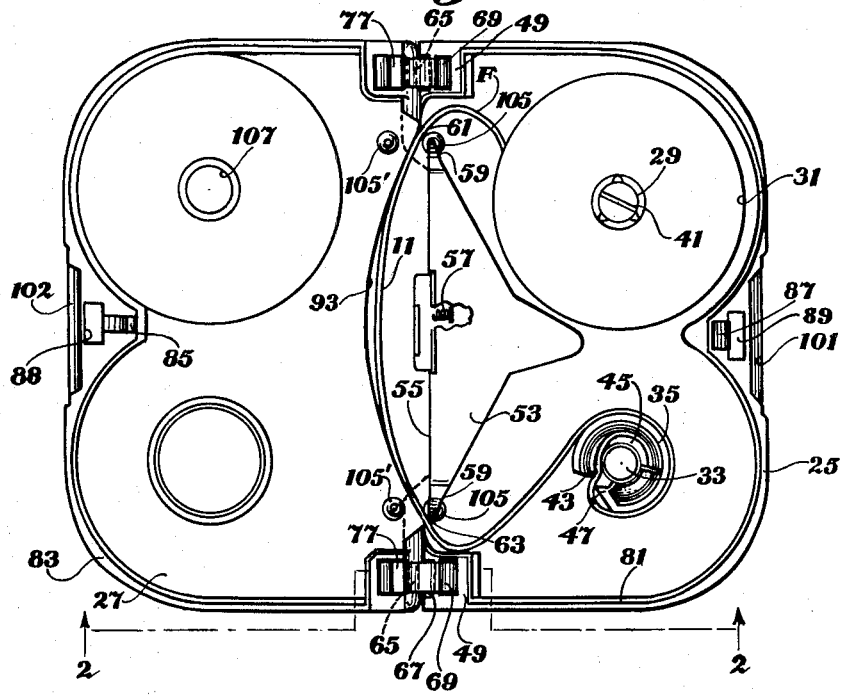

Sept. 8, 1964

M. E. BROWN 3,147,932

FILM LOADING CASSETTE

Filed June 22, 1962

2 Sheets-Sheet 1

Morris E. Brown
INVENTOR.

BY *R. Frank Smith*

*Karl T. Haramy*
ATTORNEYS

Sept. 8, 1964　　　M. E. BROWN　　　3,147,932
FILM LOADING CASSETTE

Filed June 22, 1962　　　　　　　　　2 Sheets-Sheet 2

Morris E. Brown
INVENTOR.

BY R. Frank Smith

ATTORNEYS

United States Patent Office 3,147,932
Patented Sept. 8, 1964

3,147,932
FILM LOADING CASSETTE
Morris E. Brown, Rochester, N.Y., assignor to Eastman Kodak Company, Rochester, N.Y., a corporation of New Jersey
Filed June 22, 1962, Ser. No. 204,340
6 Claims. (Cl. 242—71.2)

The present invention relates to film loading cassettes or magazines of the type which are used for loading film into motion picture cameras by inserting the cassette into the camera, and more particularly to such cassettes which are adapted to be loaded with roll film by the camera user.

Film cassettes of the type mentioned are most commonly used with 8 mm. cameras and in which the cassette is loaded with 16 mm. film. The cassette is placed in the camera with one side down and one-half (8 mm.) of the film is exposed by running the film from the supply spool to a take-up spindle. After one-half of the film has been exposed the camera is opened and the cassette is reversed side-for-side and end-for-end in the camera and the other half of the film is exposed by running the film back onto the supply spool. The use of film loading cassettes is one feature which has made this type of motion picture camera successful because it eliminates all threading problems and film fogging problems which would be present if the film was supplied and taken up on rolls which would have to be reversed in the camera and would require rethreading by the operator.

While these film loading cassettes have been widely used for years, for the most part they have been loaded by the film manufacturer and the camera user had to purchase his film in such cassettes. Since the exposed film had to be returned in the cassettes for processing, this meant that the user had to pay a deposit for the magazine each time he purchased film and this practice was expensive and bothersome.

The primary object of the present invention is to provide a film loading cassette which the camera user will own and can load himself with roll film and from which he can remove the roll of film after exposure for processing. This will considerably reduce the cost of film to such camera users and still make available to him the advantages of the film loading cassette.

A further object is to provide an improved film loading cassette of the type described which is provided with means for defining the size of the film loop extending from the cassette during the loading thereof so that it is impossible to jam or sandwich the film between the cassette and the wall of the camera when the cassette is inserted into the camera.

And still another object is to provide a cassette of the type described which has a hinged cover in which the film loop defining means is formed as a part thereof so as to become available for use when the cover is opened for loading of the cassette and then disengages the film to leave a free loop when the cassette is closed. In a preferred embodiment of the invention this loop defining means takes the form of an arcuate cutout in the hinged edge of the cover.

And yet another object is to provide a film loading cassette of the type mentioned having film guiding posts at each edge of the openings through which the film passes from and back into the cassette, and which guiding posts engage the film only at the extreme edges so as to eliminate rubbing contact between the image area of the film and the portions of the cassette defining these openings.

And still another object is to provide a film loading cassette of the type mentioned which is so designed that the cover and casing can be molded from a suitable plastic material and can be assembled in hinged relation without requiring any tools.

Figure 2:
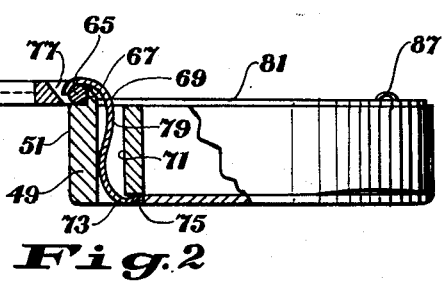
Figure 2A:
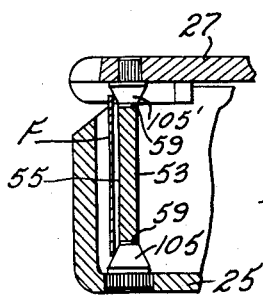

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which, FIG. 1 is a plan view of a film loading cassette constructed in accordance with a preferred embodiment of my invention in an open position and with a film loaded therein, FIG. 2 is a sectional view of the open cassette taken substantially on line 2—2 of FIG. 1, FIG. 2A is a sectional detail showing the arrangement of the conical film guide studs and film when the cassette is loaded with film and its cover is closed, FIG. 3 is a perspective view of the loaded cassette with the cover closed and ready for use, and FIG. 4 is a partial side elevational view of a motion picture camera with the cover removed and showing how a film cassette constructed according to the present invention is inserted thereinto for use.

In general, the film loading cassette of the present invention comprises an open casing having a hinged cover which can be moved between an open position, wherein it extends substantially parallel to the casing, and a closed position in which it covers the casing. In one end of the casing there is a supply spindle adapted to receive a supply roll of film and in the other end of the casing there is a take-up spindle to which the free end of the film may be attached. As is customary, each of these spindles has a clutch member accessible from the outside of opposite sides of the cassette for alternative engagement with a driven clutch member in the camera depending upon which way the cassette is inserted into the camera. In loading the cassette a supply roll of film is placed on the supply spindle and the free end of the film is first brought out of an opening in the front wall of the cassette and then brought back into the cassette through a second opening spaced from the first opening and then attached to the take-up spindle. Since the reach of film extending outside the cassette between the openings in the front wall thereof cooperates with the film advancing mechanism of the camera when the cassette is inserted thereinto it must be formed into a loop of fairly accurate size. If the loop is too small the film is apt not to properly engage the film advancing means in the camera. If the loop is too large then the film is apt to be jammed or sandwiched between the cassette and the wall of the camera when the cassette is inserted into the camera. In accordance with the present invention the cover of the cassette is provided with an arcuate cutout which, during loading of the cassette, constrains the formation of the loop to one of proper size. When the cassette is closed this cutout leaves the film loop free for engagement by the film advancing means of the camera. To eliminate rubbing contact between the image area of the film and portions of the cassette bounding the film openings in the front wall thereof, guide posts are provided on the bottom of the cassette and on the cover whch engage the film at only the extreme edges as it passes into and out of the cassette.

Figure 3:
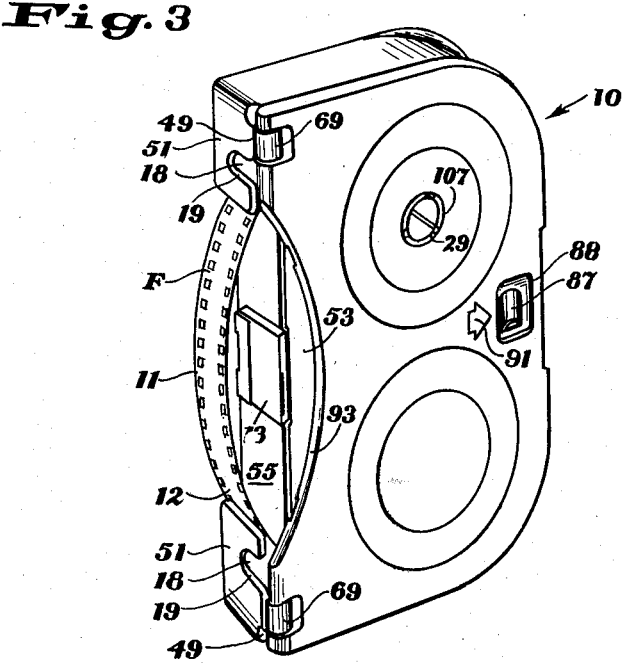
Figure 4:
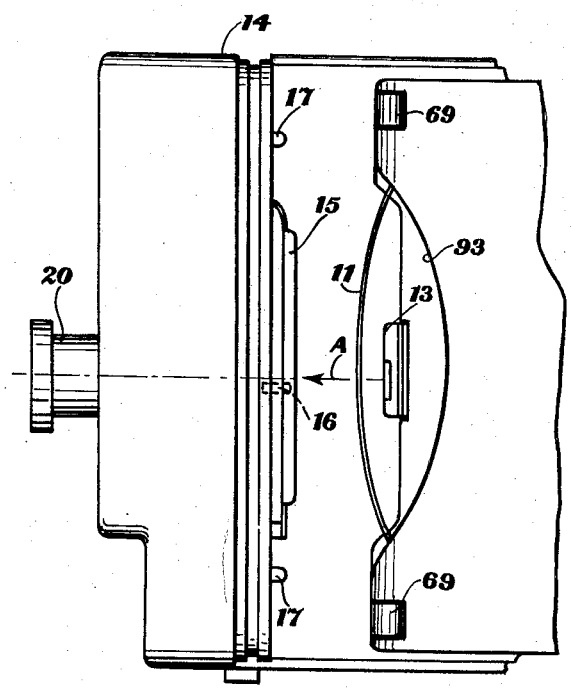

Referring first to FIGS. 3 and 4 of the drawings, the appearance of a loaded cassette and the manner in which it cooperates with the film guiding and moving means of a camera when the cassette is inserted into the camera will be described in order to more clearly point out the purpose of the present invention. As shown in FIG. 3 the loaded cassette has a free loop 11 of film F extending from the front wall 12 which includes a spring loaded gate member 13. When this cassette is placed in a motion picture camera 14, see FIG. 4, it is inserted flatwise with the film loop 11 behind the gate member 15 of the camera and is pushed forwardly along the optical axis of the camera in the direction of the arrow A. This motion of the cassette pushes the film loop into the gate member 15 of the camera and brings the film perforations into engagement or alignment with the conventional pulldown claw mechanism, designated at 16, of the camera as is well known. The cassette is pushed forward until rearwardly extending locating pins 17 on the front wall of the camera engage locating surfaces 18 on the front of the cassette, said locating surfaces being the bases of recesses 19, which also cooperate with the pins to locate the cassette laterally in a camera. When the cassette is pushed forwardly in the camera as far as locating pins 17 allow, the gate member 13, which is spring mounted as will be later described, presses a portion of the film loop 11 lightly against the gate member of the camera to hold it flat in the focal plane of the camera objective 20. Now the camera is closed by any sort of cover not shown and the camera is ready for use. The film pulldown claw mechanism will intermittently advance the film past the exposure aperture of the gate 15 by pulling it from a supply roll and the film leaving the gate will be taken up on a spindle in the cassette driven from the camera as is well known.

It will be seen that if the film loop extending from the cassette is too large there is a possibility of it being jammed or sandwiched between the front wall of the camera and the front wall of the cassette with the result that the pulldown mechanism of the camera cannot advance the film and may rip out perforations in the film in attempting to do so. By the same token, if the film loop is drawn too tightly across the front of the cassette during loading, there is the possibility that it will not properly engage the camera pulldown mechanism when the cassette is placed in a camera. Since this film loop is formed by the camera user when he loads his cassette with roll film, it is a primary object of the present invention to design the cassette so as to aid, or compel, him to form a film loop of the proper size.

Referring now to FIGS. 1 and 2, the film loading cassette constructed in accordance with a preferred embodiment of the present invention comprises an open casing 25 and a cover 27 which are both molded plastic parts and are hinged together in a manner to be described. The casing 25 is substantially as deep as the thickness of a spool of 16 mm. motion picture film, and in the top portion thereof there is rotatably mounted a supply spindle 29 onto which a supply spool of film 31 is adapted to be slipped in keyed relation thereto. In the bottom portion of the casing there is rotatably mounted a take-up spindle 33 to which a take-up hub 35 is fixed. Each of the supply spindle 29 and the take-up spindle 33 has a clutch member on one end thereof, as shown at 41 in FIG. 1 on the supply spindle, which is adapted to alternatively engage a corresponding clutch member on the drive spindle, not shown, of the camera when the cassette is placed in the camera in reversed positions as is well known in the art. The take-up hub 35 has a radial slot 43 leading into a concentric slot 45 to permit the end of the film to be inserted into the hub whereupon a ratchet tooth 47 engages a perforation in the film to attach the film end to the hub. This tooth is so formed that when the film is being driven back onto the supply spool the film will become readily disengaged from the take-up hub.

At the upper and lower corners of the front of the casing there is a hinge support 49 which is generally L-shaped and which extends the full depth of the casing. The front edge 51 of each of these hinge supports include the recesses 19, the bases of which form the locating surfaces against which locating pins 17 on the camera seat, see FIG. 3. The space between the inner ends of hinge supports 49 is closed by a generally triangular shaped hollow partition 53 (see FIG. 1) which is fixed to the bottom of the casing and extends substantially flush with the top edge thereof. The front wall 55 of the partition 53 is set back slightly from the front edges 51 of the hinge supports and it is in this wall of the partition that gate member 13 is mounted and urged forwardly by one or more light compression springs 57 situated within the hollow partition, see FIG. 1. The corners 59 of the partition 53 are spaced from the inner ends of the hinge supports 49 to form openings 61 and 63 in the front of the casing through which the film extends out of the casing from the supply spool 31, into the free loop, and then back into the casing to the take-up hub 35.

The cover 27 is complementary in shape to the casing and at each corner of the hinged edge thereof is provided with a hinge pintle 65, which rests upon the top of opposite ones of the hinge supports 49 of the casing and abuts against a lug 67 extending upwardly from each of said supports, see FIG. 2. The cover is held in hinged relation with the casing by a pair of spring clips 69 of the form best shown in FIG. 2. After the hinge pintles 65 are set atop the hinge supports 49 of the casing, one of these spring clips is pushed through a bore 71 extending through each of the hinge supports until a turned-up end 73 thereon snaps over a ledge 75 formed in the back wall of the casing adjacent the bore. When the spring clips are so inserted into the hinge supports the upper curved end thereof overhangs the hinge pintles on the cover by extending into a hole 77 formed therebeyond. When so assembled, the offset 79 formed in the spring clips place the clips under tension so as to cause the upper end thereof to normally urge the hinge pindles against the top of the hinge supports and the lugs 67 extending upwardly therefrom while allowing them to pivot as the cover is opened and closed. This arrangement of parts affords a very easy assembly of the cover to the casing without the need of any tools.

The upper edge of the casing and the inner edge of the cover are provided with continuous ribs 81 and 83, respectively, which are offset from one another to nest when the cover is closed and thereby provide a light tight joint for the cassette about the entire edge thereof except at the front wall. The cover is latched closed when a tapered lug 85 extending inwardly therefrom snaps past the curved end 87 of a latch spring which normally overhangs an aperture 89 into which the lug extends when the cover is closed. In the closed position of the cover the curved end 87 of the latch spring extends through an aperture 88 in the cover, and to release the cover the curved end of the spring latch is engaged by the finger and pushed in the direction of the arrow 91 on the cover, see FIG. 3.

To facilitate proper formation of the film loop 11 the hinged edge of the cover is provided with an arcuate cutout 93, the edge of which is adapted to engage the edge of a film as the cassette is loaded in order to define the size of the film loop 11 extending to the outside of the cassette. In loading the cassette the cover is first completely opened, as shown in FIGS. 1 and 2, and the opened cassette is laid on a table or other flat support. A length of film is stripped from the supply roll 31, and the roll is placed on spindle 29, and the stripped length of film is placed edgewise through openings 61 and 63 in the front wall of the cassette, after which the leading end of the film is attached to the take-up hub 35. Should the loop not conform to the size of, or engage the edge of the arcuate cutout 93, then either the supply spool or the take-up hub is rotated until the edge of the film loop 11 lies against the edge of the arcuate cutout 93. The cover is then closed and the loop 11 in the film is left extending from the cassette. Since the hollow partition 53 is wider than the depth of arcuate cutout 93, when the cover is closed the cutout 93 is blocked off by the partition 53 to make the cassette light tight at this point. Instead of the cover being provided with the arcuate cutout for defining the size of the film loop, the cover could be made complete and a rib or a series of spaced upstanding lugs could be formed on the outside face of the cover to serve the same purpose as the cutout in defining the desired size of film loop. To facilitate opening the cover the rear edge of the casing 25 and the rear edge of the cover 27 are provided with oppositely tapered lips 101 and 102 which will provide a finger hold between the two when the cover is closed. In addition, the outside surface of the curved walls of the cover may be provided with recesses 103, see FIG. 2, to provide a finger hold for opening the cover.

In order to prevent the film from being drawn across the corners 59 of the hollow partition and possibly scratching the image area thereof I provide means whereby at these points the film is guided only at its extreme edges and the image area of the film is maintained free from contact with the corners of the partition. This means comprises a conical stud 105 fixed to the base of the casing under each corner 59 of the partition 53, the radius of the base portion of the studs being such that the surface of the studs extend beyond the corners of the partition. In the initial threaded condition of the cassette the film may be so loose as not to engage these studs, as shown in FIG. 1, but just as soon as the camera drive is started the reach of film extending between the supply and take-up will be foreshortened and the edges of the film will be drawn toward and into engagement with these conical studs. In order to likewise support the other edge of the film F at these points, the inside face of the cover 27 is provided with a pair of like conical shaped studs 105′ which, when the cover is closed, will align with the conical studs 105 in the casing and support the othert edge of the film as it passes around the corners of the partition 53, see FIG. 2A. The cover 27 is provided with an aperture 107 which will align with and expose the clutch member on the end of the supply spindle 29 when the cover is closed, see FIG. 3. The corresponding clutch member on the end of the take-up spindle will be exposed through an aperture in the base of the casing in a known manner, not shown.

From the above description it will be seen that I have provided a simple and inexpensive film loaded cassette which can be readily loaded with roll film by the camera user. The cassette is so designed that it can be made and sold for a reasonable price which makes it possible for a camera owner to purchase more than one and load them ahead of time for convenient use. The cassette comprises a casing and cover which can be readily assembled in hinged relation without the use of tools. Furthermore, it is so designed that it can be easily loaded in subdued light and the loop of film extending therefrom will be formed to the proper size without any thought on the part of the operator. In addition, the film is guided into and out of the cassette in such a manner that the image area of the film does not rub across any part of the cassette during its movement.

Since various modifications may be made without departing from the spirit of the invention, the foregoing description is to be considered as illustrative only, the scope of the invention being defined by the appended claims.

I claim:

1. A film loading cassette comprising an open casing consisting of a bottom wall bounded by an upstanding wall one reach of which is substantially straight and forms the front wall of said cassette, a supply spindle in said casing adapted to receive a roll of motion picture film; a take-up spindle in said casing; a pair of spaced openings in said front wall of said casing through the first of which the film from the supply roll is brought out of said casing and through the second of which the film is brought back into said casing for attachment to said take-up spindle during loading of the cassette and leaving a loop of film extending from the casing and beyond the front wall thereof for engagement with the film advancing means of a camera when the loaded cassette is inserted thereinto; a cover; means for hinging said cover to said front wall to move between an open position, in which said casing may be loaded with film, and a closed position, in which that portion of said film within the casing is protected from exposure to light; and means on said cover engaged by the film when said cover is open to define the size of the loop of film extending from said front wall during the threading operation, said means being disengaged from said film loop when said cover is moved to its closed position.

2. A film loading cassette adapted to receive a supply roll of film comprising an open casing consisting of a bottom wall bounded by an upstanding wall; a take-up spindle in said casing; said upstanding wall provided with a pair of spaced openings through the first of which the film from the supply roll is brought ont of said casing and through the second of which the film is reinserted into said casing for attachment to said take-up spindle during loading of the cassette and leaving a loop of film extending out of said casing and beyond the upstanding wall thereof for engagement with the film advancing means of a camera into which the loaded cassette is adapted to be inserted; a cover hinged to the top portion of said upstanding wall having said openings to move between an open position, in which said casing may be loaded with film, and a closed position, in which that portion of said film within the casing is protected from exposure to light; and means on said cover engaged by that portion of the film extending from said casing when said cover is in said open position to define the size of said loop of film during loading of the cassette, said last-mentioned means being disengaged from said said film loop when said cover is moved to its closed position.

3. A film loading cassette adapted to receive a supply roll of film comprising an open casing consisting of a bottom wall bounded by an upstanding wall; a take-up spindle in said casing; said upstanding wall provided with a pair of spaced openings through the first of which the film from the supply roll is brought out of said casing and through the second of which the film is reinserted into said casing for attachment to said take-up spindle during loading of the cassette and leaving a loop of film extending out of said casing and beyond the upstanding wall thereof for engagement with the film advancing means of a camera into which the loaded cassette is adapted to be inserted; a cover hinged to the top portion of said upstanding wall having said openings to move between an open position, in which said casing may be loaded with film, and a closed position, in which that portion of said film within the casing is protected from exposure to light; said cover provided with an arcuate cut-out portion extending inwardly of the cover from the hinged edge thereof and the face of which arcuate portion engages one face of said film loop when the cover is in its open position to define the size of said loop when loading the cassette with film, the face of said arcuate cut-out portion being disengaged from said film loop when the cover is moved to its closed position.

4. A film loading cassette comprising an open casing consisting of a bottom wall bounded by an upstanding wall one reach of which is substantially straight and forms the front wall of said cassette, a supply spindle in said casing adapted to receive a supply roll of motion picture film, a take-up spindle in said casing; a pair of spaced openings in said front wall through the first of which the film from the supply roll is brought out of said casing and through the second of which the film is reinserted into said casing for attachment to said take-up spindle during the loading of the cassette and leaving a loop of film extending from the casing for engagement with the film advancing means of the camera when the loaded cassette is inserted thereinto; a cover; means for hinging said cover to said front wall to move between an open position, in which said casing may be loaded with film, and a closed position, in which that portion of said film within the casing is protected from exposure to light; the hinged edge of said cover provided with a cut-out portion the face of which is engageable by one face of the film loop when the cover is open to define the size of said loop, the face of said cut-out portion being disengaged from said film loop when said cover is moved to its closed position; and that portion of the upper reach of the front wall of said casing embraced by said cut-out portion extending into said casing by an amount equal to the depth of said cut-out to exclude light from the casing when said cover is closed.

5. A film loading cassette comprising an open casing consisting of a bottom wall bounded by an upstanding wall one reach of which is substantially straight and forms the front wall of said cassette, a supply spindle in said casing adapted to receive a supply roll of motion picture film, a take-up spindle in said casing; a pair of spaced openings in said front wall through the first of which the film from the supply roll is brought out of said casing and through the second of which the film is reinserted into said casing for attachment to said take-up spindle during the loading of the cassette and leaving a loop of film extending from the casing for engagement with the film advancing means of a camera when the loaded cassette is inserted thereinto; a cover; means for hinging said cover to said front wall to move between an open position, in which said casing may be loaded with film, and a closed position, in which that portion of said film within the casing is protected from exposure to light; means on said cover engaged by that portion of the film extending from said casing when said cover is in said open position to define the size of said loop of film during loading of the cassette, said means being disengaged from said film loop when said cover is moved to its closed position; a guide post extending upwardly from said bottom wall of the casing adjacent one end of each opening in said front wall; and a pair of guide posts on the inside face of said cover adapted to align with said first-mentioned guide posts and lie adjacent to the other ends of said openings when the cover is closed, said guide posts adapted to engage and guide the film at its edges only as it passes through said openings.

6. A film loading cassette comprising an open casing consisting of a bottom wall bounded by an upstanding wall one reach of which is substantially straight and forms the front wall of said cassette, a supply spindle in said casing adapted to receive a supply roll of motion picture film; a take-up spindle in said casing; a pair of spaced openings in said front wall through the first of which the film from the supply roll is brought out of said casing and through the second of which the film is reinserted into said casing for attachment to said take-up spindle during the loading of the cassette and leaving a loop of film extending from the casing for engagement with the film advancing means of a camera when the loaded cassette is inserted thereinto; a cover; means for hinging said cover to said front wall to move between an open position, in which said casing may be loaded with film, and a closed position, in which that portion of said film within the casing is protected from exposure to light; said means for hinging said cover to said casing comprising a flat hinge support adjacent each corner of said front wall of the casing; an upstanding lug on each of said hinge supports; a bore extending through each of said hinge supports to the bottom of said casing; a hinge pintle at each corner of said cover, each pintle resting on one of said hinge supports and against the upstanding lug thereon; a spring clip extending through each of said bores and having one end upturned and engaging the bottom of said casing and the other end turned over one of said hinge pintles to resiliently hold the same against one of said hinge supports and the upstanding lug thereon; and means on said cover engageable by the film when said cover is open to define the size of the loop of film extending from said front wall during the threading operation, said last-mentioned means being disengaged from said film loop when said cover is moved to its closed position.

References Cited in the file of this patent
UNITED STATES PATENTS

| 1,933,807 | Hopkins | Nov. 7, 1933 |
| 3,008,661 | Estes et al. | Nov. 14, 1961 |